US007160530B2

(12) United States Patent
Dillon et al.

(10) Patent No.: US 7,160,530 B2
(45) Date of Patent: Jan. 9, 2007

(54) METAL-DOPED SINGLE-WALLED CARBON NANOTUBES AND PRODUCTION THEREOF

(75) Inventors: Anne C. Dillon, Boulder, CO (US); Michael J. Heben, Denver, CO (US); Thomas Gennett, Pittsford, NY (US); Philip A. Parilla, Lakewood, CO (US)

(73) Assignee: Midwest Research Institute, Kansas City, MO (US)

( * ) Notice: Subject to any disclaimer, the term of this patent is extended or adjusted under 35 U.S.C. 154(b) by 603 days.

(21) Appl. No.: 10/416,218

(22) PCT Filed: Apr. 4, 2002

(86) PCT No.: PCT/US02/12761

§ 371 (c)(1),
(2), (4) Date: May 7, 2003

(87) PCT Pub. No.: WO03/085178

PCT Pub. Date: Oct. 16, 2003

(65) Prior Publication Data

US 2004/0101466 A1      May 27, 2004

Related U.S. Application Data

(63) Continuation-in-part of application No. PCT/US01/01698, filed on Jan. 17, 2001.

(60) Provisional application No. 60/177,075, filed on Jan. 19, 2000.

(51) Int. Cl.
*D01F 9/12* (2006.01)

(52) U.S. Cl. .................. 423/447.1; 264/4; 977/846

(58) Field of Classification Search .................. 264/4; 423/447.1, 460; 977/846
See application file for complete search history.

(56) References Cited

U.S. PATENT DOCUMENTS 6,544,463 B1 *   4/2003   Luzzi et al. .............. 264/346
2002/0096048 A1   7/2002   Cooper et al.

OTHER PUBLICATIONS

Dillon et al., 'Storage of hydrogen in single-walled carbon nanotubes' in NATURE vol. 386 pp. 377-379 Mar. 1997.*
Mittal et al., 'Synthesis of SWNT-Based Hybrid Nanomaterials From Photolysis-Enhanced Chemical Processes' in Inn'l Conf on Carbon Jul. 14-19, 2001 Lexington Ky. pp. 288-291.*
Baughman, Ray H. et al., Carbon Nanotubes—Route Toward Applications, Science's Compass Review, vol. 297, pp. 787-792, Aug. 2002.
International Search Report, Jul. 9, 2002, PCT/US02/12761, Cited references listed below.
Lago et al., "Filling Carbon Nanotubes with Small Palladium Metal Crystallites: the Effect of Surface acid Groups" in J. Chem. Soc., Chem. Commun. pp. 1355-1356, 1995.

* cited by examiner

*Primary Examiner*—Stuart Hendrickson
(74) *Attorney, Agent, or Firm*—Paul J. White

(57) ABSTRACT

Metal-doped single-walled carbon nanotubes and production thereof. The metal-doped single-walled carbon nanotubes may be produced according to one embodiment of the invention by combining single-walled carbon nanotube precursor material and metal in a solution, and mixing the solution to incorporate at least a portion of the metal with the single-walled carbon nanotube precursor material. Other embodiments may comprise sputter deposition, evaporation, and other mixing techniques.

34 Claims, 5 Drawing Sheets

METAL-DOPED SINGLE-WALLED CARBON NANOTUBES AND PRODUCTION THEREOF

RELATED APPLICATIONS AND INCORPORATION BY REFERENCE

This application claims the benefit of International Application No. PCTUS02/12761 titled, "Metal-Doped Single-Walled Carbon Nanotubes And Production Thereof" of Anne C. Dillon, et al., and filed on 4 Apr. 2002. This is a continuation-in-part application based on International Application No. PCT/US01/01698 titled, "Single-Wall Carbon Nanotubes for Hydrogen Storage or Superbundle Formation" of Anne C. Dillon, et al. and filed on 17 Jan. 2001, which claims priority to U.S. Provisional Patent Application No. 60/177,075 filed on 19 Jan. 2000. Each application is hereby incorporated by reference for all that is disclosed therein.

CONTRACTUAL ORIGIN OF THE INVENTION

The United States Government has rights in this invention under Contract No. DE-AC36-99GO10337 between the United States Department of Energy and the National Renewable Energy Laboratory, a division of the Midwest Research Institute.

TECHNICAL FIELD

This invention relates to single-walled carbon nanotubes (SWNTs) and more specifically to metal-doped single-walled carbon nanotubes and the production thereof.

BACKGROUND ART

Hydrogen is a potentially significant source of "clean" energy. That is, hydrogen reacts with oxygen to generate energy while producing water instead of the pollutants typically associated with the combustion of fossil fuels. However, the widespread use of hydrogen as an energy source requires its efficient, safe, and cost-effective storage.

Single-walled carbon nanotubes (SWNTs) may be used for, among other uses, reversibly storing hydrogen. SWNTs are well-known and generally comprise single layer tubes or cylinders in which a single layer of carbon is arranged in the form of a linear fullerene. Crude or low-purity SWNTs may be produced according to well-known processes such as arc discharge and chemical vapor deposition (CVD). SWNTs produced according to arc discharge processes tend to include graphite and/or graphite encapsulated metals, while SWNTs produced according to CVD processes tend to include other extraneous chemical compounds. Pure or easily purified SWNTs may also be produced according to other well-known processes, such as refined laser vaporization.

In any event, the hydrogen storage characteristics of SWNTs have been studied in the past. Hydrogen storage by low-purity, arc-generated SWNTs has been shown to occur at room temperature after first being heated to 973 degrees Kelvin (K) in a vacuum ($<10^{-7}$ torr) to open and/or clean the tubes. However, when this approach was applied to laser-generated tubes, no significant hydrogen adsorption was observed. Other studies have also shown hydrogen uptake on pure SWNTs to be only negligible (about 0.1 weight percent (wt %)) at 100 atm and room temperature. Greater hydrogen storage densities of 5 to 10 wt % have been shown to occur at cryogenic temperatures (i.e., 80 degrees K) and high pressures (158 atmosphere (atm)). More recent studies have shown that large-diameter SWNTs (i.e., 1.85 nm) slowly adsorb about 4.2 wt % hydrogen at room temperature and about 100 atm over a period of about one hour. Although other studies have reported higher hydrogen adsorption, these studies have not been reproducible. See A. C. Dillon and M. J. Heben, *Applied Physics A,* 72 (2001) 133–142.

Consequently, a need remains for producing SWNTs that can be used for reversibly storing hydrogen. Additional advantages would be realized if the hydrogen adsorption and desorption process occurs without the need for high energy input, hence making the SWNTs amenable for use as hydrogen fuel cells. Further advantages would be realized if such a process were readily scalable, thereby allowing for the large scale, economical production of hydrogen storage systems.

DISCLOSURE OF INVENTION

Metal-doped single-walled carbon nanotubes (SWNTs) are produced according to embodiments of the method of the invention.

An embodiment of a method for doping SWNTs with metal may include the steps of: combining the SWNTs and metal in a solution, and mixing the solution to incorporate at least a portion of the metal with the SWNTs, thereby forming metal-doped SWNTs.

Another embodiment of a method for doping SWNTs with metal may comprise the steps of: providing a solvent, introducing the SWNTs into the solvent, introducing a metal into the solvent, and mixing the metal and the SWNTs in the solvent at least until a portion of the metal is incorporated with the SWNTs.

Another embodiment of a method for doping SWNTs with metal may comprise heating a SWNT precursor material at low pressure in the presence of the metal until at least a portion of the metal is incorporated therein.

Yet other methods for doping SWNTs with metal may comprise dry mechanical mixing of the SWNT precursor material and metal with one another, and evaporation or sputter deposition techniques.

BRIEF DESCRIPTION OF THE DRAWINGS

Illustrative and presently preferred embodiments of the invention are shown in the accompanying drawings in which.

BEST MODES FOR CARRYING OUT THE INVENTION

Figure 1:
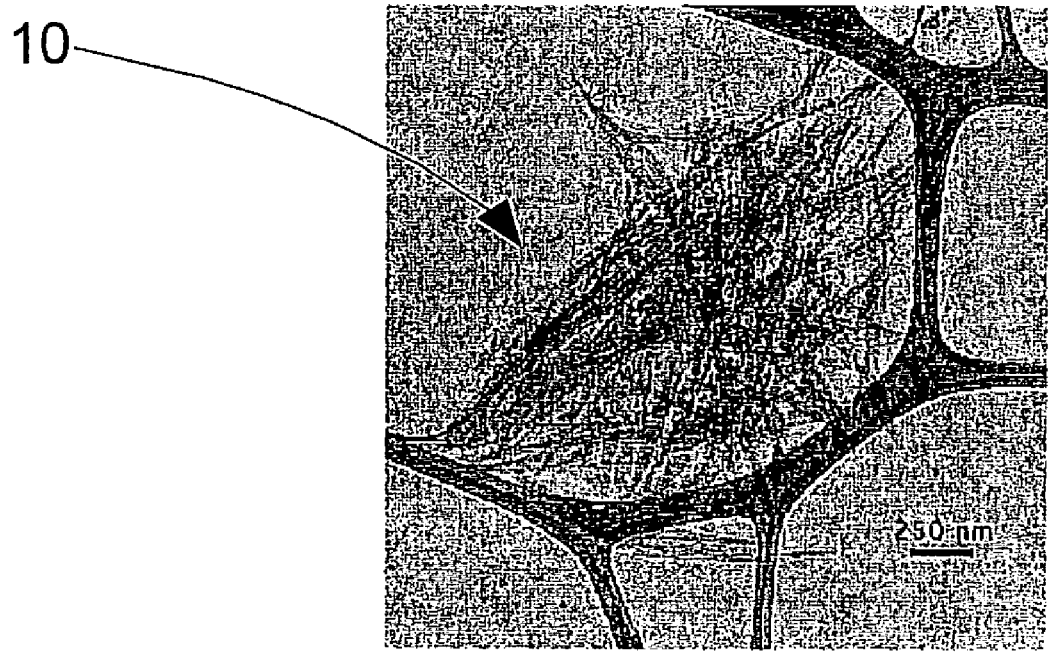
FIG. 1 is a transmission electron microscopy (TEM) image of metal-doped SWNT product.

Metal-doped single-walled carbon nanotubes (SWNTs) and production thereof is shown and described herein according to preferred embodiments of the invention. Briefly, SWNTs have been studied for their hydrogen storage characteristics. However, only modest hydrogen adsorption has been shown to occur according to reproducible techniques. Although SWNTs have been shown to exhibit more significant hydrogen storage capacities, these are typically under extreme conditions (e.g., cryogenic temperatures). Therefore, it is desirable to reliably produce SWNTs for reversibly storing hydrogen at ambient conditions with low energy input requirements.

According to embodiments of the invention, metal-doped SWNTs may be produced for reversibly storing hydrogen. One such embodiment for producing metal-doped SWNTs may include the steps of: combining SWNT precursor material and metal in a solution, and mixing the solution to incorporate at least a portion of the metal with the SWNT precursor material, thereby forming metal-doped SWNTs. Another embodiment for producing metal-doped SWNTs may comprise the steps of: providing a solvent, introducing SWNT precursor material into the solvent, introducing a metal into the solvent, and mixing the metal and the SWNT precursor material in the solvent at least until a portion of the metal is incorporated with the SWNT precursor material.

Yet other embodiments for producing metal-doped SWNTs may comprise incorporating metal in a SWNT precursor material by vaporization/evaporation techniques. For example, such an embodiment may comprise heating a SWNT precursor material at low pressure in the presence of the metal until at least a portion of the metal is incorporated therein. Still other embodiments for producing metal-doped SWNTs may comprise mixing, and evaporation or sputter deposition techniques.

It should be noted that the steps described with respect to the foregoing embodiments could be performed in other sequences since the order of the steps is not critical in achieving the objects and advantages of the present invention. For example, according to another embodiment of the invention, the metal may be introduced to the solvent prior to introducing the SWNT precursor material. Alternatively, the metal and the SWNT precursor material may be introduced simultaneously. Consequently, the present invention should not be regarded as limited to performing the steps in any particular order.

A significant advantage of the metal-doped SWNTs produced according to embodiments of the invention is the relatively high hydrogen storage capacity of these SWNTs. In addition, hydrogen adsorption and desorption occurs with relatively low energy input requirements, and advantageously, under ambient conditions.

Having briefly described metal-doped SWNTs and embodiments of a method for production thereof, as well as some of the more significant advantages associated therewith, the various embodiments of the present invention will now be described in greater detail below.

The source or precursor material for producing metal-doped SWNTs according to the teachings of the invention may comprise crude and/or purified SWNTs. The SWNT precursor material, or SWNT soot, may be synthesized according to any of a number of well-known techniques. These techniques include, by way of example, pulsed laser vaporization, chemical vapor deposition and arc-generation. Where it is desirable to use purified SWNTs, the raw SWNTs may be purified according to well-known purification techniques (e.g., by acid reflux, filtering, and/or washing). However, it is understood that the invention is not limited to use with a pure or purified SWNT precursor material, and the metal-doped SWNTs may also be produced using impure SWNT precursor material.

Regardless of the methods for producing the SWNT precursor material, the SWNT precursor material and a metal and/or metal alloy may be introduced into a solvent, such as a nitric acid solution. The SWNT precursor material and the metal are preferably mixed in the solvent at least long enough for a portion of the metal to be incorporated with the SWNT precursor material. By way of illustration and according to one embodiment of the invention, the SWNT precursor material may be placed in a nitric acid solution and sonicated using a metal probe (e.g., a Ti-6Al-4V probe). The metal is introduced into the solution from the metal probe itself during sonication (e.g., by partially fragmenting and/or dissolving therein). Although prolonged sonication may damage the metal-doped SWNT product, sonication times of 20 minutes to 24 hours at powers ranging from 25–250 W/cm$^2$ results in only moderate cutting of the metal-doped SWNTs.

According to other embodiments of the invention, however, the metal and/or metal alloy may be incorporated into the SWNTs by vaporization/evaporation of the metal in the presence of the SWNT precursor material. The metal is preferably heated in the presence of the SWNT precursor material at least to the vaporization temperature of the metal in a vacuum, at least long enough for a portion of the metal to be incorporated with the SWNT precursor material. By way of illustration and according to one embodiment of the invention, the SWNT precursor material may be placed in a metal packet (e.g., aluminum or aluminum alloy) and resistively heated to the vaporization temperature of the metal (e.g., about 1100° C. for aluminum) in a vacuum of about $10^{-5}$ or $10^{-6}$ mTorr. At least a portion of the metal from the metal packet evaporates and is introduced into the SWNT. Alternatively, the metal may be introduced by vaporization of the metal from a powder form. In such an embodiment, the SWNT precursor material need not necessarily be heated.

Yet other embodiments for incorporating metal with the SWNT precursor material are also contemplated as being within the scope of the invention. For example, the SWNT precursor material and the metal and/or metal alloy may be mechanically mixed until the desired proportion of metal is introduced with the SWNT. Or for example, the metal may be introduced by the well-known technique of sputtering deposition or vapor transport of an organometellic compound.

It is understood that any suitable SWNT precursor material, and characteristics thereof (e.g., chirality, size, conductivity, etc.) may be used according to the teachings of the invention. Likewise, any suitable metal and/or metal alloy may be used according to the teachings of the invention. For example, the metal may comprise pure metal, metal alloys, solids, organometallic precursor materials (e.g., Ti-isopropoxide or Fe-hexacarbonyl), etc. The selection of a SWNT precursor material and/or metal based on the properties thereof will depend on the desired characteristics of the metal-doped SWNT product.

The metal-doped SWNT material produced according to the method of the present invention may be imaged in accordance with any of a wide range of microscopy processes that are now known in the art or that may be developed in the future that are suitable for imaging particles in the nano-size range. For example, FIG. 1 is an image of cut, single-wall carbon nanotube material 10 produced by a transmission electron microscope in a process generically referred to as transmission electron microscopy (TEM). Bundles of small fragments of the cut SWNTs as well as metal nano-particles are readily seen in the TEM image in FIG. 1. These bundles comprise numerous tubes with lengths of less than one micron.

In addition, the metal-doped SWNT material produced according to the method of the present invention may be further characterized in accordance with any of a wide range of analysis techniques that are now known in the art or that may be developed in the future that are suitable for determining the metal content thereof. For example, x-ray diffraction of the metal-doped SWNT material may be used to confirm the presence of metal in the metal-doped SWNT product (e.g., the presence of Ti-6Al-4V following sonication).

Likewise, thermal gravimetric analysis (TGA) of the metal-doped SWNT product may be used to determine the metal content in the metal-doped SWNT product. TGA analysis of the metal-doped SWNT product produced according to the method of the invention showed that the metal alloy content in samples sonicated for at least 16 hours ranged from 15 wt % to 65 wt %. However, not all of the incorporated metal alloy is active. To illustrate this, a density extraction of the metal alloy was employed to remove the larger micro-crystalline particles, without affecting the hydrogen adsorption properties thereof.

As previously discussed, following production, the metal-doped SWNT product may be used for reversibly storing hydrogen. The metal-doped SWNT product may be charged with hydrogen as follows. According to one embodiment of the invention, the metal-doped SWNT product may be initially degassed by heating the metal-doped SWNT product in a vacuum. For example, the metal-doped SWNT product may be heated to temperatures of about 823 to 973 degrees K at a ramp rate of about 1 degree K/second (K/sec) in a vacuum of about $10^{-7}$ torr. Following degassing of the metal-doped SWNT product, it may then be exposed to hydrogen for adsorption thereof. For example, the metal-doped SWNT product may be exposed to hydrogen at room temperature for about one minute at pressures of about 10 to 550 torr to charge the metal-doped SWNT product with hydrogen.

The scope of the invention is not, however, limited to any particular temperature and/or pressure range. Indeed, in other examples, partial hydrogen coverage of the metal-doped SWNT product was observed following hydrogen exposure at only 10 mtorr. In addition, the hydrogen adsorption of the metal-doped SWNT product depends on a number of factors, and may in fact be "finely tuned" by varying the SWNT tube types as well as the amount and type of metal incorporated into the metal-doped SWNT product.

The hydrogen adsorption characteristics of the metal-doped SWNT product produced according to the method of the present invention may be determined in accordance with any of a wide range of analysis techniques that are now known in the art or that may be developed in the future that are suitable for such analysis. For example, temperature programmed desorption (TPD) is a well-known technique for characterizing surface reactions and molecular adsorption. According to this technique, the sample is heated in a controlled manner while recording the evolution of various species from the sample to the gas phase. TPD measures desorbing species and enables the determination of both capacity and binding-site energetics. That is, the data comprises the intensity variation of each recorded mass fragment as a function of time and temperature, as shown for example in FIG. 2. The area under the peak is proportional to the amount of the various species that was adsorbed on the sample. The position of the peak is related to the strength of the surface adsorption.

The TPD instrument may be readily calibrated by integrating the hydrogen mass signals observed for the thermal decomposition of known amounts of $CaH_2$, $TiH_2$, or palladium hydride. The metal-doped SWNT sample may be cooled to 90 degrees K prior to evacuation of the TPD chamber to ensure that the hydrogen, which is weakly stable at room temperature, remains on the metal-doped SWNT sample while the hydrogen over-pressure is evacuated and allows the TPD chamber to be quickly evacuated to a base pressure of about $5 \times 10^{-8}$ torr.

TPD analysis of the metal-doped SWNT product produced by introducing the metal from the probe during sonication, according to the procedure described above, indicated that the hydrogen adsorption capacity of the metal-doped SWNT product ranges from about 2 wt % to about 7 wt %. For example, sonicating purified SWNTs for 16 hours at 50 W/cm$^2$, followed by degassing the metal-doped SWNT product to 825 degrees K resulted in a total hydrogen capacity of about 7 wt % (see spectrum 12 in FIG. 2). Sonication at powers that exceed 250 W/cm$^2$ may reduce subsequent hydrogen uptake even though TEM analysis demonstrates that the nanotubes may not be destroyed.

Figure 2:
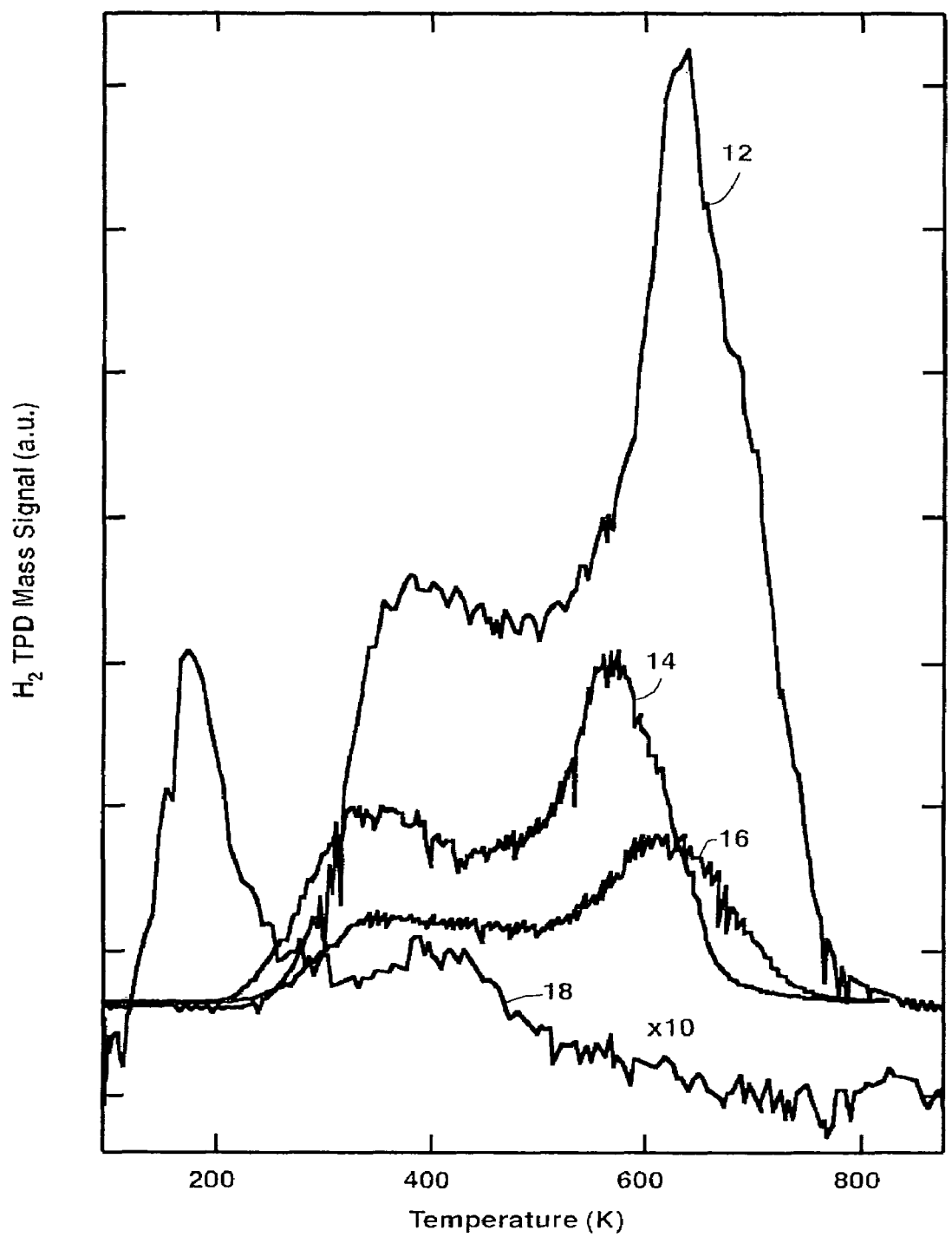
FIG. 2 shows a temperature programmed desorption (TPD) spectra for a metal-doped SWNT product charged with hydrogen in comparison to a Ti-6Al-4V sample, a graphite powder sample, and a purified, mechanically cut SWNT sample, each also having been charged with hydrogen.

The TPD spectrum 12 showing hydrogen signals for an ultrasonically-cut, degassed, metal-doped SWNT sample following brief exposure to 500 torr of hydrogen at room temperature is shown in FIG. 2. The hydrogen TPD spectrum 12 displays two separate peaks at about 370 degrees K and at about 630 degrees K. Hence, the results indicate the presence of the two types of hydrogen adsorption sites.

Integrating under the curve 12 indicates that the hydrogen adsorption capacity for the metal-doped SWNT sample corresponds to 6.5 wt % on a total sample weight basis. The hydrogen adsorption capacity at the low temperature site (e.g., 370 degrees K) amounts to about 2.5 wt % and evolves at room temperature by evacuating the chamber for a period of about twelve hours. The hydrogen in the low-temperature site was completely removed by heating the sample to 423 degrees K for several minutes. The hydrogen from the higher temperature site was not evolved until the sample was heated between about 475 degrees K and about 850 degrees K.

It should be noted that the total hydrogen adsorption capacity of the metal-doped SWNT material produced according to the teachings of the invention may vary based on design considerations. Such design considerations may include, for example, the SWNT material, the metal alloy, the sonication power, sonication time, the hydro-dynamics of the sonication vessel and the sample degas temperature, etc. Adjustments in these parameters may also affect the temperature and relative intensity of the hydrogen desorption signal(s).

The effect of the metal in the metal-doped SWNT on hydrogen adsorption may be characterized by comparing the TPD spectrum 12 (FIG. 2) of the metal-doped SWNT to the TPD spectrum 18 (FIG. 2) of a purified SWNT that is mechanically cut (e.g., by grinding with a mortar and pestle) but does not have any metal incorporated therein. The TPD spectrum 18 of the purified SWNT indicates that hydrogen is also adsorbed at the low-temperature site (e.g., at about 350 degrees K). Thus, the low temperature hydrogen adsorption site of the metal-doped SWNT (e.g., shown at about 370 degrees K on spectrum 12 in FIG. 2) may be populated by any process that produces cutting and/or opening of the SWNT material, and hydrogen adsorption at this site is not necessarily assisted by the metal incorporated therein. In some cases, however, adsorption at the low temperture site may be enhanced by the metal.

The TPD spectrum 18 (FIG. 2) of the purified SWNT does not show any hydrogen adsorption at the high temperature sites (e.g., at about 630 degrees K on spectrum 12 in FIG. 2). Accordingly, hydrogen adsorption at the high temperature sites of the metal-doped SWNT may be assisted by the metal incorporated therein. Generally, metal hydrides (e.g., Ti-6Al-4V) absorb hydrogen by dissociating the molecule and incorporating mono-atomic hydrogen into the metal lattice. A dissolved phase is formed at low hydrogen concentrations with higher levels giving rise to complex compound formation (e.g., $TiH_2$). Although the hydrogenation of carbon is not expected to occur or to be so rapid at room temperature and pressure, the metal alloy may enable the dissociation of hydrogen molecules to facilitate the formation of carbon-hydrogen bonds.

The presence and effect of carbon-hydrogen bond formation on the adsorption of hydrogen by the metal-doped SWNT product may be probed further according to transmission infrared (IR) absorption spectroscopy techniques using thin films of nanotubes prepared on silicon (Si) substrates. Carbon-hydrogen stretches were observed on nanotubes that had been purified and cut, but there was not a drastic change in the C—H population after the same samples were exposed to hydrogen. Hence, the large amount of stored hydrogen is likely not "chemisorbed" in the traditional sense.

Conventionally described "physisorption" by itself also may not account for a strong enough interaction for stabilization of either the low or high temperature hydrogen. Therefore, the interaction may be mid-way between weak van der Waals stabilization and strong carbon-hydrogen bond formation. Preliminary Raman data reveals a small shift and a quench in the SWNT Raman signals following hydrogen adsorption, suggesting that charge is transferred from the SWNT backbone to the adsorbed hydrogen. The bonding orbitals of the carbon atoms naturally prefer to be $sp^2$ hybridized but the curvature of the tube wall may give rise to some $sp^3$ character. Hydrogen molecules may interact with these $sp^3$-like orbitals to withdraw electron density from the tube and thus to form a "bond" or a complex that might normally be formed as a transition state during true carbon-hydrogen bond formation.

The role of the metal alloy may be to provide local thermal energy. The exothermic incorporation of hydrogen into the alloy may locally enhance the amplitudes of carbon atom vibrations and thus accentuate the $sp^3$ character of the wall atoms. Once conditions are favorable for complex formation then hydrogen molecules may be transported along the tube axes as the $sp^3$ structure is "zipped" down the tube length. Conditions may be most favorable for this behavior at points where cuts in the tube wall were in close proximity to metal alloy particles. In addition, the samples are stable to cycling with no apparent degradation when the vacuum is relatively clean and the sample temperature does not exceed about 825 degrees K, indicating only a partial charge transfer rather than dissociative adsorption.

In addition, it is important to note that the metal-doped SWNTs produced according to embodiments of the method of the invention are air-stable. That is, after the metal-doped SWNTs have been charged with hydrogen, the hydrogen does not desorb and instead remains on the metal-doped SWNTs even after being exposed to air. After being exposed to air for one day, only small quantities of carbon dioxide ($CO_2$) and water ($H_2O$) (less than $\frac{1}{50}^{th}$ of the adsorbed hydrogen) are adsorbed onto the metal-doped SWNTs, as may be determined by TPD analysis.

The metal-doped SWNT product that is first exposed to air, and particularly the carbon dioxide component thereof, may be unusable for hydrogen storage. If the metal-doped SWNT product is initially exposed to carbon dioxide, the carbon dioxide may adsorb onto the metal-doped SWNT product and prohibit subsequent hydrogen adsorption. To illustrate the effect of carbon dioxide adsorption onto the metal-doped SWNT product, a metal-doped SWNT product produced according to the method of the invention was exposed to carbon dioxide for 10 minutes at 500 torr and room temperature and then exposed to hydrogen. TPD analysis of the exposed metal-doped SWNT revealed only a carbon dioxide signal and no hydrogen signal, thus indicating that hydrogen adsorption is completely blocked by the prior carbon dioxide exposure. Although the carbon dioxide may only adsorb to binding sites at the mouths of open tubes or facets of cut bundles, significant hydrogen adsorption requires that the hydrogen permeate the internal volumes of SWNT bundles. Therefore, hydrogen adsorption may be effectively blocked by prior carbon dioxide exposure. Alternatively, the metal may be deactivated by the carbon dioxide and therefore no longer facilitate hydrogen adsorption on the SWNTs.

In addition, carbon dioxide may hinder hydrogen desorption if it is dosed onto the metal-doped SWNT after it has been charged with hydrogen. Advantageously, exposure of the metal-doped SWNT product that has been charged with hydrogen maybe effectively "capped" to facilitate the handling of bulk quantities of SWNTs in hydrogen storage and gas separation applications.

Figure 3:
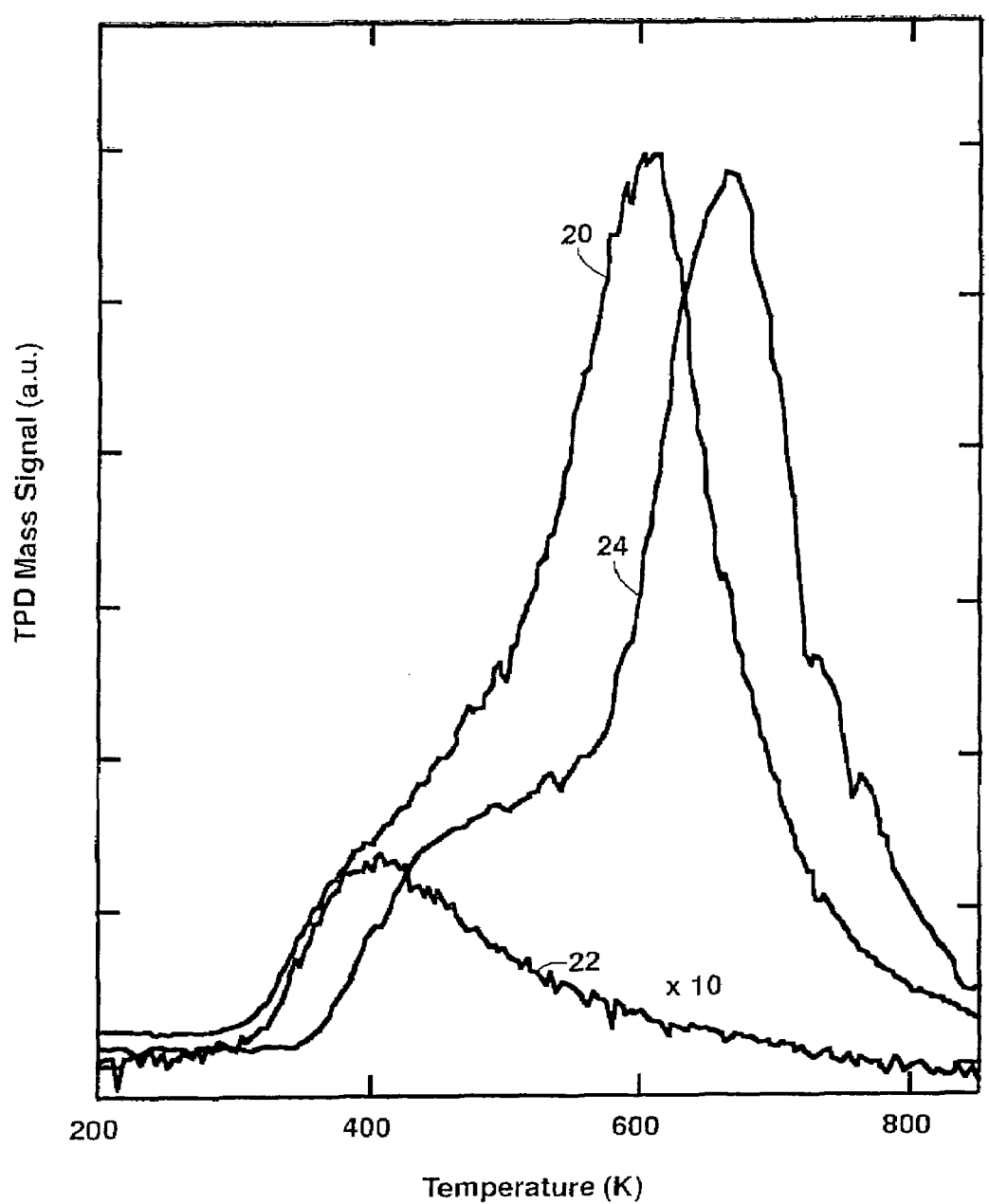
FIG. 3 shows a TPD spectra of a metal-doped SWNT product in comparison with the hydrogen and carbon dioxide signals after exposure to air.

To illustrate carbon dioxide "capping" of the metal-doped SWNT product, metal-doped SWNT samples were produced according to the method of the invention and exposed to hydrogen at 500 torr and 273 degrees K without any subsequent cooling and analyzed by TPD analysis. The spectrum 20 (FIG. 3) of the metal-doped SWNT samples that were analyzed immediately following hydrogen exposure show two peaks at about 420 degrees K and 602 degrees K. For comparison, a metal-doped SWNT sample was exposed to carbon dioxide at room temperature, 500 torr for ten minutes following hydrogen exposure and also analyzed by TPD analysis. The carbon dioxide signal (spectrum 22 in FIG. 3) at 400 degrees K shows a small population of adsorption sites on the metal-doped SWNT sample. Thus, the TPD analysis of the carbon dioxide-exposed, metal-doped SWNT sample indicates that the carbon dioxide desorbs from the metal-doped SWNT product at lower temperatures and impedes the desorption of hydrogen therefrom, as shown by the hydrogen desorption signal (spectrum 24 in FIG. 3) which is shifted to a higher temperature by about 50 degrees K. This small population of carbon dioxide adsorption may block the desorption of hydrogen until a significant portion of the carbon dioxide has already left the sample. The metal-doped SWNT product that is capped using carbon dioxide according to these embodiments of the method may remained charged with hydrogen for at least six months.

Before continuing with specific examples, it should be noted that other embodiments of the method of the invention are also contemplated as being within the scope of the invention. For example, the SWNT precursor material may be made according to any suitable technique, now known or later developed. These techniques may include, but are not limited to, chemical vapor deposition, arc-generation, and laser-vaporization. Likewise, the SWNT precursor material may be pure or impure. In addition, any number of other suitable metals, and the amounts thereof, may be used according to the teachings of the invention to control the amount of hydrogen adsorption and/or the hydrogen desorption temperature of the metal-doped SWNT product. For example, the metal(s) may include, but are not limited to a titanium-aluminum-vanadium alloy (e.g., Ti-6Al-4V), a titanium-iron alloy (e.g., Ti—Fe), titanium (Ti), magnesium (Mg), palladium (Pd), tantalum (Ta), tungsten (W), iron (Fe), and organo-metallic compounds, to name but a few. In addition, the process of incorporating the metal need not be by ultra-sonication with a sonic probe in dilute nitric acid. For example, the metal may be added to solution and incorporated into the SWNT precursor material by sonication without a sonic probe, and/or by mechanical mixing methods, sputtering, evaporation, etc. Likewise, any number of a variety of solvents, ranging from polar to non-polar, may be used according to the teachings of the invention. High temperature annealing may also be employed either before or after the metal incorporation to increase the degree of cutting of the SWNTs, and thereby enhance the hydrogen storage characteristics thereof.

EXAMPLES

SWNT soot (i.e., SWNT precursor material) was synthesized using a well-known pulsed laser vaporization technique that is described in more detail by T. Guo, P. Nikolaev, A. Thess, D. T. Colbert, and R. E. Smalley, in *Chemical Physics Letters* 243, 49–54 (1995). More specifically, the technique employed for this example included the use of a single Nd:YAG laser (1064 nm) rastered across a 1.2 at % metal-doped (50:50 Co/Ni) pressed graphite target in a quartz tube heated to 1200 degrees Celsius (C). An argon flow of 100 sccm at 500 torr was maintained through the reaction vessel during the synthesis. The laser was operated at a frequency of 10 Hz at about 10 to 30 J/pulse-cm$^2$ with a pulse width of about 450 ns. The SWNT soot produced according to this method had a diameter of about 1.1–1.4 nm.

The SWNT soot was purified by refluxing it in 3 molar (M) nitric acid for 16 hours, filtering it, and washing the filtered product with de-ionized water and then oxidizing it in air for 30 minutes at 825 degrees K. Care was taken to avoid both forming graphite-encapsulated metal particles and incorporating sputtered target material into the collected soot. The combined laser synthesis and purification process resulted in SWNTs that were at least 98 wt % pure.

Pure SWNT precursor material weighing about 1–3 milligrams (mg) was placed in 20 (milliliters) mL of 5M nitric acid and sonicated with a Heat Systems-Ultrasonics Inc. model w-220 degrees F Cell Disrupter with a Ti-6Al-4V probe for 16 hours. This process resulted in large-scale cutting and an increased average bundle diameter of the SWNT material. In addition, x-ray diffraction confirmed Ti-6Al-4V in the metal-doped SWNT product following sonication. TGA analysis of the metal-doped SWNT product during combustion of the carbon fraction in flowing air indicated that it contained about 15 wt % Ti-6Al-4V.

All of the samples were initially degassed in a vacuum of about $10^{-7}$ torr by heating the samples to temperatures between about 823 and 973 degrees K at 1 K/sec. The metal-doped SWNT product was charged with hydrogen by exposure to hydrogen at room temperature for about one minute at pressures between about 10 and 550 torr. At ambient pressure and room temperature, the metal-doped SWNTs were charged with about 3.0 to 8.0 wt % hydrogen.

The hydrogen-charged, metal-doped SWNT product was characterized using a temperature programmed desorption (TPD) technique discussed in greater detail in A. C. Dillon, et al., *Nature* 386, 377–379 (1997) and A. C. Dillon, et al., Carbon Nanotube Materials for Hydrogen Storage, Proceedings of the U.S. DOE Hydrogen Program Review, Coral Gables, Fla. (1995). The instrument was calibrated by integrating the hydrogen mass signals observed for the thermal decomposition of known amounts of $CaH_2$, $TiH_2$, or palladium hydride. The sample was cooled to 90 degrees K prior to evacuation of the TPD chamber. Cooling ensured that the hydrogen which was weakly stable at room temperature would remain on the sample while the hydrogen overpressure was evacuated and allowed a base pressure of about $5 \times 10^{-8}$ torr to be quickly obtained. The hydrogen-charged alloy-doped SWNT samples were air-stable, and thus were removed from the vacuum in order to confirm the calibration by thermal gravimetric analysis (TGA). The hydrogen uptake measured by the two different methods was within 10%. Good agreement for hydrogen uptake in metal hydride samples was also measured by TPD and by volumetric techniques.

The TPD spectrum 12 showing hydrogen signals for an ultrasonically-cut, degassed, metal-doped SWNT sample following brief exposure to 500 torr of hydrogen at room temperature is shown in FIG. 2. The hydrogen TPD spectrum 12 displays two separate peaks at about 370 degrees K and at about 630 degrees K. Hence, the results indicate the presence of the two types of hydrogen adsorption sites. Integrating under the curve 12 indicates that the hydrogen adsorption capacity for the metal-doped SWNT sample corresponds to 6.5 wt % on a total sample weight basis. The hydrogen adsorption capacity at the low temperature site (e.g., 370 degrees K) amounts to about 2.5 wt % and was evolved at room temperature by evacuating the chamber overnight. The hydrogen in the low-temperature site was completely removed by heating the sample to 423 degrees K for several minutes. The hydrogen from the higher temperature site was not evolved until the sample was heated between about 475 degrees K and 850 degrees K.

Raman spectroscopy may also be used to ascertain certain properties of the metal-doped SWNT produced according to the method of the invention. Raman spectroscopy is an established analytical technique that provides highly accurate and definitive results. For example, Raman spectroscopy methods may be used to determine the intensity and position of the tangential carbon displacement modes at various steps in the pretreatment and hydrogen adsorption process. A small shift in the tangential band coupled with a loss in intensity following hydrogen adsorption indicates a partial charge transfer from the SWNTs to the adsorbed hydrogen molecules.

A rough calculation based on the Raman up-shift and degree of charge transfer observed for iodine intercalated SWNTs, indicates that the Raman shift of 3 cm$^{-1}$ seen for the hydrogen-charged sample relative to the pure, degassed material is consistent with a charge transfer of about 0.01 electron per hydrogen atom. Carbon-hydrogen bonds formed on the nanotube walls could remove electron density as is seen in the electrochemistry of hydrogenated $C_{60}$. However, the formation of carbon-hydrogen bonds should remove more electron density than observed here. The complete hydrogenation/dehydrogenation of the nanotubes may result in the destruction of the SWNT structure as is seen for $C_{60}$.

Further analysis of the metal-doped SWNT product involved measuring a Ti-6Al-4V alloy to determine the uptake by the SWNT fraction of the metal-doped SWNT product. The alloy sample was collected from the ultrasonic probe after sonicating for 16 hours in 5M nitric acid without the addition of any SWNT material and analyzed according to the same TPD technique, as shown in FIG. 2. The TPD spectrum 14 exhibits two desorption peaks at 345 and 560 degrees K that are similar to those found in the alloy-doped SWNT sample, but occur at slightly lower temperatures. Although other studies of hydrogen adsorption on Ti-6Al-4V report the presence of only one hydrogen adsorption site, the prolonged sonication in nitric acid may have altered the surface oxide layer causing changes in the hydrogen adsorption properties thereof. The integrated amount of hydrogen found adsorbed on the alloy by TPD is about 2.5 to 3 wt %. Assuming the alloy fraction 15 wt % behaves like the pure alloy sample, then the SWNT fraction adsorbs about 7.2 wt % hydrogen.

As another comparison, a graphite powder was also sonicated for 16 hours in 5M nitric acid, and analyzed according to the same TPD technique, as shown in FIG. 2. The Ti-6Al-4V alloy content of the graphite sample (i.e., that was released from the probe during sonication of the graphite) was about 26 wt %. The TPD spectrum 16 indicates that the integrated amount of hydrogen is about 1.2 wt % on a total sample weight basis. Based on the amount of alloy in the sample, hydrogen adsorption should only be about 0.6 wt %. Therefore, the alloy may have activated about 0.7 wt % on the graphite fraction.

As yet a further comparison, a purified SWNT sample was mechanically cut by grinding with a mortar and pestle. The TPD spectrum 18 is similar to that observed when arc-generated material was opened by self-oxidation during degassing. Thus, the low temperature hydrogen adsorption sites may be populated by any process that produces cutting and/or opening, and access to this site does not necessarily require the functionality of the metal alloy.

Figure 4:
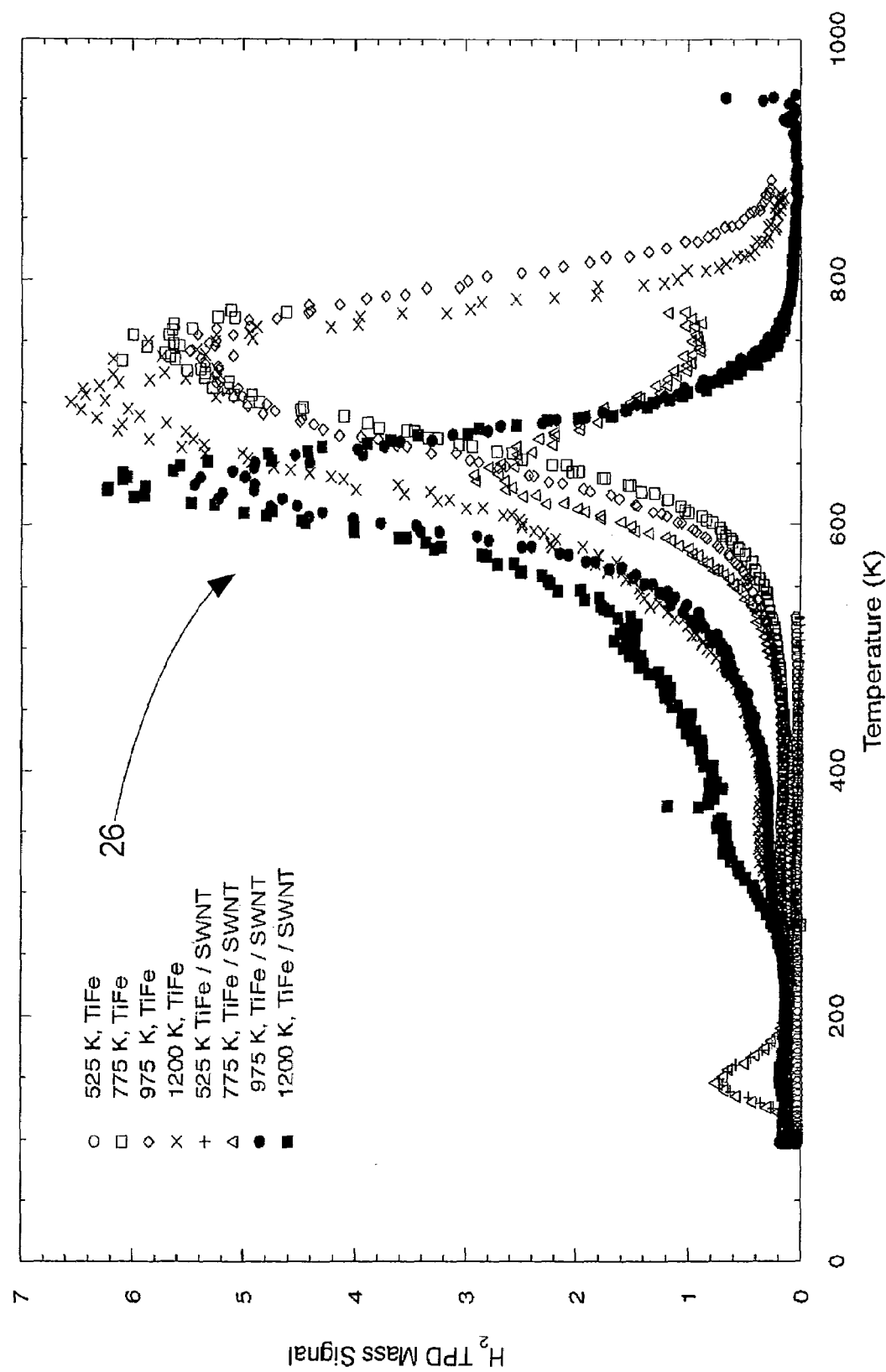
FIG. 4 shows a TPD spectra of a metal-doped SWNT product in comparison with an alloy sample.

In another example, Fe—Ti was incorporated into the SWNT precursor material by sonicating the metal hydride and the SWNT precursor material at a 1:2 ratio, respectively, in toluene for two hours. The resulting metal-doped SWNT material was separately degassed to 525, 775, 975, and 1200 degrees K and then exposed to hydrogen at 500 torr and room temperature. The spectra 26 shown in FIG. 4 are normalized to a one milligram sample of the metal hydride. The spectra 26 clearly show that the hydrogen desorption temperature is shifted to lower values as the degas temperature is increased.

Figure 5:
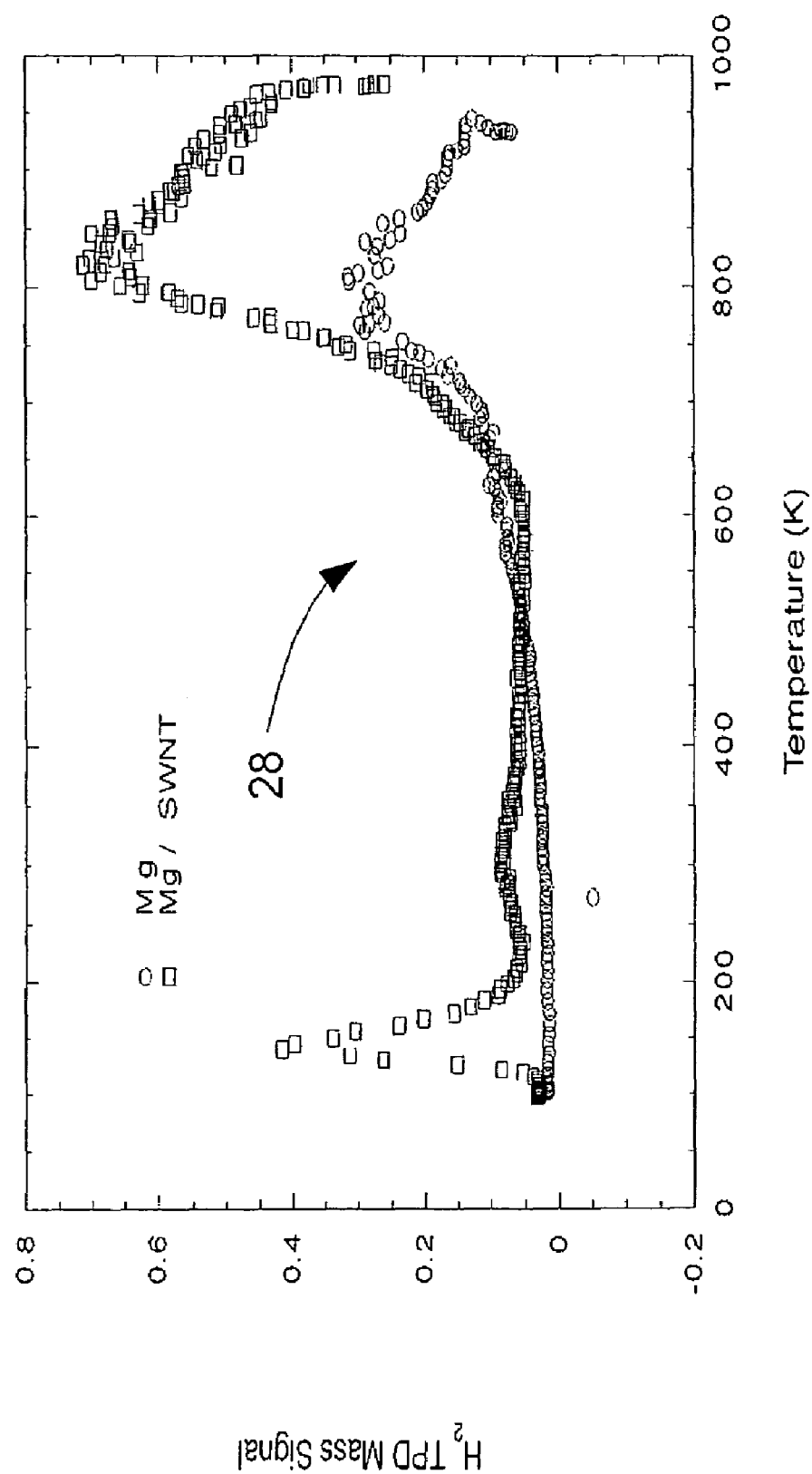
FIG. 5 shows a TPD spectra of a metal-doped SWNT product in comparison with an alloy sample.

In another example, Mg was incorporated into the SWNT precursor material by sonicating the metal hydride and the SWNT precursor material at a 1:2 ratio, respectively, in toluene for two hours. The resulting metal-doped SWNT material was degassed to 775 degrees K and then exposed to hydrogen at 500 torr and room temperature. TPD spectra 28 shown in FIG. 5 are normalized to one milligram of Mg. The TPD spectra 28 indicates hydrogen desorption peaks for the metal-doped SWNT product at 140, 305, and 822 degrees K. Note that the hydrogen desorption from the Ti-6Al-4V SWNT was observed at 345 and 560 degrees K, with respect to spectra 12 in FIG. 2. It is therefore clear that the temperature at which the hydrogen desorbs from the metal-doped SWNT product may be "tuned" by varying the composition of the metal hydride.

In yet other examples, the pure SWNT precursor material was mixed with between about 1 and 50% Ti-6Al-4V or Pd by sonication in dilute nitric acid without the use of a sonic probe. Mixing Ti-6Al-4V and the SWNT precursor material on a 1:1 basis resulted in metal-doped SWNT product having about a 3 wt % hydrogen adsorption capacity. Mixing Pd and the SWNT precursor material on a 1:1 basis resulted in metal-doped SWNT product having a very low temperature hydrogen desorption signal centered at approximately 225 degrees K attributed to the SWNT material itself, and a higher temperature desorption signal at approximately 375 degrees K attributed to desorption from the Pd itself.

In another example, the pure SWNT precursor material was placed in a Tantalum (Ta) metal packet comprising 100% of solid Ta metal, and resistively heated to about 1450 degrees K in a vacuum chamber (i.e., between about $10^{-5}$ and $10^{-6}$ Torr) for about 30 minutes. Metal-doped SWNT product was observed to be incorporated therein by TEM analysis. The metal appeared to fill the interior cavities of the SWNTs.

In still another example, approximately 0.5 mg Ti-6Al-4V alloy was combined with about 1.0 mg pure SWNT precursor material, and the two were manually ground using a motar and pestle for about 30 minutes at room temperature. The low-temperature hydrogen storage peak was found to be partially activated. Other methods for dry-mixing may include, but are not limited to, ball milling.

It is readily apparent that the metal-doped SWNT product produced according to embodiments of the method of the invention exhibit unique hydrogen adsorption properties under ambient conditions. In addition, the hydrogen adsorption capacity may be increased and/or the desorption temperature may be modified by cutting the SWNTs and incorporating a metal hydride therein. Accordingly, the process of doping the SWNTs with metal is particularly advantageous for finely tuning the properties of the SWNT hydrogen storage medium. Consequently, the claimed invention represents an important development of a hydrogen storage system.

Having herein set forth preferred embodiments of the present invention, it is anticipated that suitable modifications can be made thereto which will nonetheless remain within the scope of the present invention. Therefore, it is intended that the appended claims be construed to include alternative embodiments of the invention except insofar as limited by the prior art.

The invention claimed is:

1. A method for doping single-walled carbon nanotubes (SWNTs) with metal, comprising:
    combining a SWNT precursor material and metal in a solution; and
    mixing said solution to incorporate at least a portion of said metal with said SWNT precursor material, thereby forming metal-doped SWNTs, wherein mixing said solution comprises sonicating said SWNT precursor material and said metal.

2. The method of claim 1, wherein combining said SWNT precursor material and said metal comprises combining purified SWNT precursor material with said metal.

3. The method of claim 1, wherein combining said SWNT precursor material and said metal comprises combining crude SWNT precursor material with said metal.

4. The method of claim 1, wherein combining said SWNT precursor material and said metal comprises combining said SWNT precursor material with at least one metal selected from the group consisting of Ti-6Al-4V, Ti—Fe, Ti, Mg, Pd, Ta, W, Fe, and organo-metal compounds.

5. The method of claim 1, wherein mixing said solution comprises mechanically mixing said SWNT precursor material and said metal.

6. The method of claim 1, further comprising introducing said metal into said solution from a sonic probe.

7. The method of claim 1, further comprising charging said metal-doped SWNTs with hydrogen.

8. The method of claim 7, wherein charging said metal-doped SWNTs comprises charging said metal-doped SWNTs with about 3.0 to 8.0 wt % hydrogen at ambient pressure and room temperature.

9. The method of claim 1, further comprising combining said SWNT precursor material and said metal in a solvent.

10. The method of claim 1, further comprising capping said metal-doped SWNTs with carbon dioxide.

11. A method for doping single-walled carbon nanotubes (SWNTs) with metal, comprising:
providing a solvent;
cutting and aligning a SWNT precursor material;
introducing said SWNT precursor material into said solvent;
introducing a metal into said solvent; and
mixing said metal and said SWNT precursor material in said solvent at least until a portion of said metal is incorporated with said SWNT precursor material.

12. The method of claim 11, further comprising forming said SWNT precursor material by a process selected from the group consisting of chemical vapor deposition, arc-generation, and laser-vaporization.

13. The method of claim 11, further comprising purifying said SWNT precursor material.

14. A method for doping single-walled carbon nanotubes (SWNTs) with metal, comprising cutting and aligning a SWNT precursor material, mixing said cut and aligned SWNT precursor material with said metal until at least a portion of said metal is incorporated with said cut and alingned SWNT precursor material.

15. A method for doping single-walled carbon nanotubes (SWNTs) with metal, comprising:
combining a SWNT precursor material and metal in a solution, wherein introducing said metal into said solution is from a sonic probe; and
mixing said solution to incorporate at least a portion of said metal with said SWNT precursor material, thereby forming metal-doped SWNTs.

16. The method of claim 15, wherein combining said SWNT precursor material and said metal comprises combining purified SWNT precursor material with said metal.

17. The method of claim 15, wherein combining said SWNT precursor material and said metal comprises combining crude SWNT precursor material with said metal.

18. The method of claim 15, wherein combining said SWNT precursor material and said metal comprises combining said SWNT precursor material with at least one metal selected from the group consisting of Ti-6Al-4V, Ti—Fe, Ti, Mg, Pd, Ta, W, Fe, and organo-metallic compounds.

19. The method of claim 15, wherein mixing said solution comprises mechanically mixing said SWNT precursor material and said metal.

20. The method of claim 15, wherein mixing said solution comprises sonicating said SWNT precursor material and said metal.

21. The method of claim 15, further comprising charging said metal-doped SWNTs with hydrogen.

22. The method of claim 21, wherein charging said metal-doped SWNTs comprises charging said metal-doped SWNTs wit about 3.0 to 8.0 wt % hydrogen at ambient pressure and room temperature.

23. The method of claim 15, further comprising combining said SWNT precursor material and said metal in a solvent.

24. The method of claim 15, further comprising capping said metal-doped SWNTs with carbon dioxide.

25. A method for doping single-walled carbon nanotubes (SWNTs) with metal, comprising:
combining a SWNT precursor material and metal in a solution;
mixing said solution to incorporate at least a portion of said metal with said SWNT precursor material, thereby forming metal-doped SWNTs; and
capping said metal-doped SWNTs with carbon dioxide.

26. The method of claim 25, wherein combining said SWNT precursor material and said metal comprises combining purified SWNT precursor material with said metal.

27. The method of claim 25, wherein combining said SWNT precursor material and said metal comprises combining crude SWNT precursor material with said metal.

28. The method of claim 25, wherein combining said SWNT precursor material and said metal comprises combining said SWNT precursor material with at least one metal selected from the group consisting of Ti-6Al-4V, Ti—Fe, Ti, Mg, Pd, Ta, W, Fe, and organo-metallic compounds.

29. The method of claim 25, wherein mixing said solution comprises mechanically mixing said SWNT precursor material and said metal.

30. The method of claim 25, wherein mixing said solution comprises sonicating said SWNT precursor material and said metal.

31. The method of claim 25, further comprising introducing said metal into said solution from a sonic probe.

32. The method of claim 25, further comprising charging said metal-doped SWNTs with hydrogen.

33. The method of claim 32, wherein charging said metal-doped SWNTs comprises charging said metal-doped SWNTs wit about 3.0 to 8.0 wt % hydrogen at ambient pressure and room temperature.

34. The method of claim 25, further comprising combining said SWNT precursor material and said metal in a solvent.

* * * * *